United States Patent Office 3,575,933
Patented Apr. 20, 1971

3,575,933
PROCESS FOR PREPARING BENZAMIDE POLYMERS
Erhard F. Hoegger, John R. Schaefgen, and Curtis W. Stephens, Wilmington, Del., assignors to E. I. du Pont de Nemours and Company, Wilmington, Del.
No Drawing. Filed Dec. 28, 1967, Ser. No. 694,041
Int. Cl. C08g 20/20
U.S. Cl. 260—78 15 Claims

ABSTRACT OF THE DISCLOSURE

A process preparing benzamide polymers by reacting monomeric aromatic thionylamines of the formula:

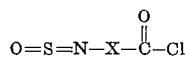

wherein X is selected from the group consisting of:

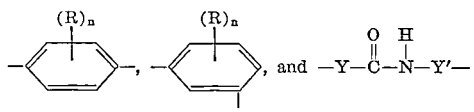

wherein R is a monovalent radical which is inert in the polymerization reaction, $n$ is a cardinal number from 0 to 4 and, Y and Y' are individually selected from the group consisting of:

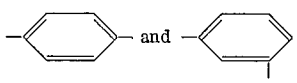

Both homopolymer and copolymer preparation is described, including suitable solvents useful for polymerization and/or for forming shaped articles of the polymer. Suitable bases, added to the reaction medium, promote the formation of high viscosity polymer.

FIELD OF THE INVENTION

This invention relates to novel processes for preparing poly(p-benzamide) and poly(m-benzamide), together with analogs and copolymers thereof, and to novel solutions thereof.

DESCRIPTION OF THE PRIOR ART

The process of this invention which provides poly(m-benzamide), also identified as poly(1,3-benzamide), constitutes a distinct improvement over those disclosed in Stephens Br. 901,159 and in Huffman et al. U.S. 3,203,933 for preparing this polymer by low temperature polymerization processes from a salt of a m-aminobenzoyl halide, such as m-aminobenzoyl chloride hydrochloride. Similarly, the instant processes are an improvement over that of Preston et al. U.S. 3,225,011 which describes the preparation of a poly(p-benzamide), or poly(1,4-benzamide), from p-aminobenzoyl chloride hydrochloride using a slurry polymerization technique. These patents disclose that the necessary reactants may be formed by first reacting the aminobenzoic acid with thionyl chloride to form the thionylaminobenzoyl chloride which is subsequently treated with hydrogen chloride in ether to produce the desired monomer. The present invention permits direct polymerization of the thionylaminobenzoyl chlorides to soluble, high molecular weight, film- and fiber-forming polymers, thus eliminating the requirement to produce the aminobenzoyl halide salt used by the above patentees. The condensations of m-thionylaminobenzoyl chloride, p-thionylaminobenzoyl chloride, and related monomers to high molecular weight products by means of the present inveniton differ significantly from the condensation of p-thionylaminobenzoyl chloride to the dimeric N-(p-aminobenzoyl)-p-aminobenzoic acid described by E. Riesz in Revista de la Facultad de Humanidades y Ciencias, Universidad de Montevideo, 2, No. 3, 65–73 (1948). Similarly, the present invention is readily distinguishable from the heating of m-thionylaminobenzoyl chloride and water to produce the cyclic m-diamide of m-aminobenzoic acid and an uncharacterized polymeric product, as reported by P. Carré and D. Liberman in Compt. rend., 201, 147–149 (1935).

SUMMARY OF THE INVENTION

This invention provides novel processes for preparing readily soluble, benzamide polymers from thionylaminobenzoyl chloride precursors, and further provides shapeable solutions of these polymers. These and other provisions of this invention are accomplished by placing in a vessel a reaction mixture preferably comprising an inert solvent or solvent mixture, at least one type of thionylaminobenzoyl chloride monomer, preferably together with lithium chloride and an appropriate basic reagent, and preferably maintaining the mixture between about 0° C. and 135° C. for from about 0.1 hr. to about 24 hr. to accomplish the desired degree of polymerization. Suitable mono- and multi-functional chain terminating agents, when desired, may be added to the reaction mixture. If the resulting polymeric composition is not directly formed into shaped articles such as fibers and films, the polymeric product may be isolated by, e.g., agitating the composition with a suitable polymer non-solvent, e.g., water.

DESCRIPTION OF THE PREFERRED EMBODIMENTS

Polymer preparation

In accordance with one aspect of this invention, there is provided a process for preparing a high molecular weight polyamide comprising at least one type of recurring unit of the formula (I)

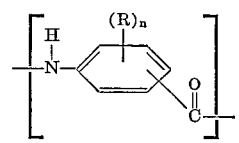

in which the —NH— and —CO— radicals are oriented meta or para with respect to each other, R is any substituent group or radical, directly attached to the benzene ring, which is inert in the polymerization reaction, e.g., halogen, lower alkyl, lower alkoxy, nitro, cyano, carbomethoxy, acetyl, acetamido, dimethylamino, diethylamino, ethylsulfonyl, ethylthio, methylsulfonyl, diethylcarbamoyl, and the like, $n$ is a cardinal number from 0 to 4 inclusive.
The Formula I composition may be obtained by polymerizing under the conditions of this invention at least one type of monomer of the formula (II)

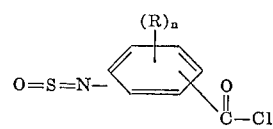

wherein the carbonyl chloride radical is oriented meta (II-m) or para (II-p) with respect to the thionylamino radical and R and $n$ have the above-described significance. Preferred Formula II monomers are p-thionylaminobenzoyl chloride and m-thionylaminobenzoyl chloride which provide poly(p-benzamide) and poly(m-benzamide), respectively, when used in the process of this invention. Other (II-p) monomers useful in the process of this invention include: 3-methyl-4-thionylaminobenzoyl chloride, 3-fluoro-4-thionylaminobenzoyl chloride
2-chloro-4-thionylaminobenzoyl chloride
2,6-dichloro-4-thionylaminobenzoyl chloride
3,5-dichloro-4-thionylaminobenzoyl chloride
3-bromo-4-thionylaminobenzoyl chloride
2,6-dibromo-4-thionylaminobenzoyl chloride
2-fluoro-4-thionylaminobenzoyl chloride
2,3-dimethyl-4-thionylaminobenzoyl chloride
2,6-dimethyl-4-thionylaminobenzoyl chloride
3-ethyl-4-thionylaminobenzoyl chloride
2-nitro-4-thionylaminobenzoyl chloride
3,5-dinitro-4-thionylaminobenzoyl chloride
3-ethoxy-4-thionylaminobenzoyl chloride
2-ethoxy-5-nitro-4-thionylaminobenzoyl chloride
2-propoxy-4-thionylaminobenzoyl chloride
2-isobutoxy-4-thionylaminobenzoyl chloride
2-sec. butoxy-4-thionylaminobenzoyl chloride
3-propoxy-4-thionylaminobenzoyl chloride
3-isopropoxy-4-thionylaminobenzoyl chloride
3-butoxy-4-thionylaminobenzoyl chloride
2-methylthio-4-thionylaminobenzoyl chloride
2-ethylthio-4-thionylaminobenzoyl chloride
2-ethylsulfonyl-4-thionylaminobenzoyl chloride
2-dimethylsulfamoyl-4-thionylaminobenzoyl chloride
2,3,5,6-tetramethyl-4-thionylaminobenzoyl chloride
2,5-dimethyl-4-thionylaminobenzoyl chloride
3,5-dimethyl-4-thionylaminobenzoyl chloride Other useful (II–m) monomers include:

4-methyl-3-thionylaminobenzoyl chloride
4-ethyl-3-thionylaminobenzoyl chloride
4-isopropyl-3-thionylaminobenzoyl chloride
4-isopropenyl-3-thionylaminobenzoyl chloride
4-tert. butyl-3-thionylaminobenzoyl chloride
2,6-dimethyl-3-thionylaminobenzoyl chloride
2-chloro-3-thionylaminobenzoyl chloride
4-chloro-3-thionylaminobenzoyl chloride
5-bromo-3-thionylaminobenzoyl chloride
2,5-dichloro-3-thionylaminobenzoyl chloride
4,6-dichloro-3-thionylaminobenzoyl chloride
5-nitro-3-thionylaminobenzoyl chloride
4-dimethylamino-3-thionylaminobenzoyl chloride
2-butoxy-3-thionylaminobenzoyl chloride
2-isopropoxy-3-thionylaminobenzoyl chloride
4-propoxy-3-thionylaminobenzoyl chloride
2-acetyl-3-thionylaminobenzoyl chloride
4-methylthio-3-thionylaminobenzoyl chloride
4-ethylthio-3-thionylaminobenzoyl chloride The Formula II monomers may be prepared from the appropriate aminobenzoic acid and thionyl chloride by the general procedure of Graf and Langer, J. prakt. Chem. 148, 161–169 (1937).

In another working of this invention, the above-described polyamide of Formula I, wherein $n=0$, may be prepared by the process of this invention, comprising reacting at least one type of "dimeric" monomer of the formula:

(III)            $$O=S=N-Y-\overset{O}{\underset{\|}{C}}-\overset{H}{\underset{|}{N}}-Y'-\overset{O}{\underset{\|}{C}}-Cl$$

wherein Y and Y′ are individually selected from the group consisting of:

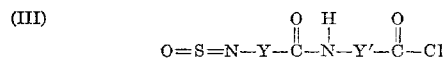

The dimeric p(p-thionylaminobenzamido)benzoyl chloride (III–p,p), m(m-thionylaminobenzamido)benzoyl chloride (III–m,m), and p(m-thionylaminobenzamido)benzoyl chloride (III–p,m) may be prepared by applying the general procedure of Graf and Langer, above, to p-(p-aminobenzamido)benzoic acid, to m-(m-aminobenzamido)benzoic acid and to p-(m-aminobenzamido)benzoic acid, respectively, which acids are described by H. Bredereck and H. von Schuh in Chem. Ber. 81, 215–221 (1948). The dimeric m(p-thionylaminobenzamido)benzoyl chloride (III–m,p) may be prepared by the general procedure of Graf and Langer, above from m(p-aminobenzamido) benzoic acid, described by Bredereck and von Schuh, above. In preparing (III–m,p), the Graft and Langer procedure may be modified to the extent that a large excess of toluene is employed as a diluent in the reaction. When only one type of dimeric monomer of Formula III is polymerized, a homopolymer having recurring units of the formula:

(IV) 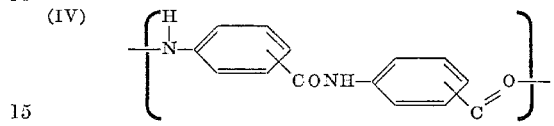

the orientation being that of the dimeric monomer (i.e., p,p; m,m; p,m; or m,p) is obtained. When two or more types of dimeric monomers of Formula III are polymerized the polymer will be comprised of two or more corresponding recurring units of Formula IV. Processes for preparing poly(p-benzamide) and poly(m-benzamide), together with polymeric analogs and copolymers thereof, are within the scope of this invention. For example, a homopolymer is prepared when only one type of monomer of the Formula II or III is polymerized. Two or more types of monomers of the Formula II or III may be polymerized together, in all proportions, and a copolymer generally is prepared. However when, for example, the Formula II monomer p-thionylaminobenzoyl chloride is polymerized together with the Formula III monomer p(p-thionylaminobenzamido)benzoyl chloride (III–p,p), the resultant polymer is the homopolymer, poly(p-benzamide).

Copolyamides having at least one type of recurring unit of the formula:

(V) 

in addition to those defined by Formula I and/or IV, above, wherein Z represents a divalent organic radical comprising at least two carbocyclic rings possessing benzenoid unsaturation and which may also bear substituents inert in the polymerization such as those exemplified for R above, are prepared in accordance with another aspect of this invention. The amounts (calculated on a mole basis) of the Formulas I, IV, and/or V units may be varied over the entire composition range. Formula V units in the copolymer chain may be derived by utilizing in the process of this invention at least one type of monomer of the formula:

(VI) 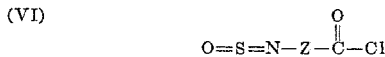

wherein Z has the significance set forth hereinbefore.

Formula VI comonomers useful in the process of this invention include:

4-thionylamino-4′-chlorocarbonyldiphenyl ether
4-thionylamino-4′-chlorocarbonyldiphenyl methane
4-thionylamino-4′-chlorocarbonylbiphenyl
3-thionylamino-4′-chlorocarbonylbiphenyl
3-thionylamino-3′-chlorocarbonylbiphenyl
4-thionylamino-3′-chlorocarbonylbiphenyl
6-methyl-4-thionylamino-4′-chlorocarbonylbiphenyl
2′-methyl-4-thionylamino-4′-chlorocarbonylbiphenyl
7-thionylamin-2-naphthoyl chloride
6-thionylamino-2-naphthoyl chloride
5-thionylamino-2-naphthoyl chloride
2-(4-thionylaminophenyl)-2-(4-chlorocarbonylphenyl) propane, and the like.

Formula VI monomers may be prepared from the appropriate aminocarboxy compound (e.g., 4-amino-4′-carboxy diphenyl ether) by the general procedure of Graf and Langer, cited above, utility of which is further disclosed in Smith et al. U.S. 3,240,758.

Both random and block copolyamides may be prepared by the process of this invention by varying the order of addition of the comonomers II, III, and/or VI to the reaction vessel. The polyamides and copolyamides prepared by the process of this invention may contain up to 2% by weight sulfur and each exhibits an inherent viscosity of at least about 0.2, measured as described hereinafter.

Polymerization conditions

The polymerizations of this invention may be performed by dissolving the desired monomer or comonomers in an inert solvent or solvent mixture, preferably under a nitrogen atmosphere and with agitation. There may simultaneously be present in the reaction vessel quantities of material selected from the group of an appropriate inorganic basic reagent, lithium chloride, and any desired chain terminating agent or agents. However, any or all of the latter three types of materials may be added to the reaction vessel at any time during the polymerization period, if desired, since considerable variance in their addition is possible within the scope of the instant invention. While the presence of water in small amounts (less than equimolar quantities) is not deleterious to this polymerization process since, indeed, it is useful as a chain terminating agent, it is desirable that the amount of water initially present in the reaction mixture be kept to a minimum. This insures that a stoichiometric amount of water may be added by subsequent regulated additions to the reaction mixture, if desired. The mode of addition is important for ensuring optimum high molecular weight polymer. The stirred reaction mixture is maintained between about 0° C. and 135° C., preferably between about 20° C. and 135° C., from about 0.1 hr. to about 24 hr., preferably from about 0.5 hr. to about 4 hr. to accomplish the desired degree of polymerization. The polymerized contents of the reaction vessel may be present as a solution, a fluid dispersion, a partially or completely gelled mass, or a precipitate, depending on (1) the solvent or solvent mixture initially employed with the monomer and comonomer, (2) the duration and temperature of the reaction, or (3) the presence or absence of any of a useful basic reagent, lithium chloride, or chain terminator(s) in the reaction mixture. Where appropriate, the product can be precipitated by agitating the contents of the reaction vessel with a polymer nonsolvent, for example, water. The collected precipitate after being washed with, e.g., water and acetone, may be dried in a vacuum oven.

Generally the instant polymerization process may be carried out in any inert medium which is a solvent for the thionylamino reactants. There may be employed a solvent or solvent mixture selected from the group of hydrocarbons, halogenated hydrocarbons, dialkylamides, ethers, or mixtures thereof. Useful solvents include benzene, chlorobenzene, N,N-dimethylacetamide, N-methylpyrrolidone-2, N,N,N'N'-tetramethylurea (hereinafter identified as tetramethylurea), N-methylcaprolactam, N-acetylmorpholine, N-acetylpiperidine, N - acetylpyrrolidone-2, N,N-diethylacetamide, N-ethylpyrrolidone-2, N,N-dimethylpropionamide, N,N-dimethylbutyramide, N,N-dimethylisobutyramide, N,N-dimethylethylene urea, hexamethylphosphoramide, tetrahydrofuran, diphenyl ether, and the like. Use of solvents such as benzene, chlorobenzene, and carbon tetrachloride in the process generally produces polymers of very low inherent viscosity. Preferred solvents are the alkyl-substituted amides or mixtures containing them. These preferred solvents dissolve or swell the polymers as it is formed and promote formation of higher molecular weight products. The singularly preferred solvent for the polymerization process of this invention is tetramethylurea, preferably used in combination with from 0.5 to 2% lithium chloride (by weight, based on tetramethylurea).

The addition of lithium chloride to the reaction mixture is preferred; amounts ranging from zero to the solubility limits, under given condition, may be used.

Choice of a specific polymerization medium may depend in part on the particular form in which it is desired to isolate the polymer. For example, since the products of this invention are insoluble in hydrocarbon solvents, they precipitate from, e.g., benzene or benzene-dialkylamide mixtures when they are used in the process. Such precipitates may be redissolved in another medium, as shown below, from which shaped articles may be obtained. However, when particular solvents such as tetramethylurea, N,N-dimethylacetamide, N,N-dimethylisobutyramide, 1,3-dimethylimidazolidinone-2, and N-methylpyrrolidone-2 or mixtures thereof are used in combination with lithium chloride as the medium in which to polymerize p-thionylaminobenzoyl chloride, there may be obtained a viscous solution of poly(p-benzamide) which may be directly extruded into fibers or cast into films.

It is highly preferred to provide a basic solvent media for the polymerization reaction of this invention. Although polymer may be obtained having an inherent viscosity greater than about 0.2 without any base present in the reaction media, higher viscosity polymer (greater than about 0.3 to about 0.8) is generally not obtained unless a base is present. The effect of the presence of base is shown in Example 24. Suitable bases are among those selected from the group consisting of alkali metal hydroxides, alkaline earth hydroxides, and aqueous ammonium hydroxide or combination thereof. Water also serves as a base in the process of this invention. Most preferred among these bases are lithium hydroxide and lithium hydroxide monohydrate. Although the invention is not to be limited by the theoretical considerations involved, it is believed that the mechanism of the polymerization reaction may require that OH− or HOH groups be present to promote chain extension (i.e., high molecular weight polymer). It is believed that these groups react with the thionylaminochlorocarbonyl monomers to promote formation of the poly- or copolyamide.

In addition to the preference for the above bases to promote chain extension, it is also highly desirable to provide these or other basic compounds to neutralize the hydrogen chloride evolved in the polymerization, thus eliminating the need to employ corrosion resistant spinning equipment when fibers are prepared directly from a polymerization medium. In addition to, or in combination with, the bases previously listed, basic carbonates and oxides, such as lithium carbonate, lead carbonate, calcium oxide, etc., are also suitable. When lithium hydroxide or carbonate is used, the lithium chloride salt formed through this neutralization further serves to increase the polymerization rate and to produce polymers of higher inherent viscosity.

The use of approximately equimolar amounts of base and thionylaminochlorocarbonyl monomer is most preferred. Large amounts of base (e.g., greater than 50 to 100% over stoichiometry) should preferably be avoided in order to prevent formation of low molecular weight polymer.

As indicated above, chain terminators may be used in these polymerizations to assist in control of the molecular weights of the products. Among the suitable chain terminators are monofunctional compounds which can react with the acid chloride ends of these polyamides such as ammonia, monoamines (e.g., methylamine, dimethylamine, ethylamine, butylamine, dibutylamine, cyclohexylamine, aniline, etc.), compounds containing a single amide-forming group, such as N,N - diethylethylenediamine, hydroxylic compounds such as methyl alcohol, ethyl alcohol, isopropyl alcohol, phenol, water, etc., monofunctional compounds which can react with the amine ends of the polyamide such as other acid chlorides (e.g., acetyl chloride, benzoyl chloride, thionyl chloride), together with multifunctional terminators such as isophthaloyl chloride, terphthaloyl chloride, m-phenylenediamine, and the like. Preferred for molecular weight control are p-aminobenzoic acid and isophthaloyl chloride.

In the process of this invention, poly(p-benzamide) polymers of high molecular weight, as measured by inherent viscosity, are obtained when longer rather than shorter period of time elapse prior to the addition of the basic reagent, e.g., lithium hydroxide, to a reaction mixture being maintained at a given temperature. Examples 11 and 14 herein demonstrate this feature. Similarly, the inherent viscosity of poly(p-benzamide) obtained by the process of this invention is proportional to the concentration of lithium chloride added initially. The polymerization of p-thionylaminobenzoyl chloride in tetramethylurea by the process of this invention is accelerated by the presence of lithium chloride, thionyl chloride, and water.

Preparation and use of polymer solutions

As noted above, viscous solutions of poly(p-benzamide) may be directly converted into shaped articles when the polymerization of p-thionylaminobenzoyl chloride is carried out in a solvent such as tetramethylurea, N,N-dimethylacetamide, N,N-dimethylisobutyramide, 1,3-dimethylimidazolidinone-2, and N-methylpyrollidine-2, including mixtures thereof, in combination with lithium chloride. In those instances where the polymerization product is isolated as a precipitate, the solid product may be dissolved in a suitable solvent, e.g., a mixture of tetramethylurea/lithium chloride (93/7) by weight by use of high speed stirring or in sulfuric acid, and the resulting solutions may be converted into fibers and other shaped articles.

These directly prepared or redissolved polymer solutions may be extruded into fiber or films may be cast by conventional techniques and equipment. Polymer having an inherent viscosity greater than about 0.8 is suitable for fiber formation. In wet spinning, an appropriately prepared solution of the particular polyamide or copolyamide is extruded into a suitable coagulating bath, e.g., a water bath maintained at 25–90° C. Other useful coagulants include ethylene glycol, glycerol, mixtures of alcohol and water, aqueous salt baths, etc. Dry spinning may be accomplished by extruding filaments of a suitable solution, e.g., tetramethylurea/lithium chloride solution of poly(p-benzamide), preferably maintained at 50–150° C., into a heated column whereby the solvent is evaporated. Coherent filaments can be prepared from solutions of these polymers having as low a solids content as 5%, a content much lower than that from which filaments of other polymers can usually be prepared. The tensile properties of the polyamide filaments prepared from the polymer solutions of this invention can be enhanced by subjecting them, while under tension or relaxed, to a brief heating in a nitrogen atmosphere at temperatures in the vicinity of 500°–535° C.

The polymer solutions of this invention can be used as liquid coating compositions which are applied to a variety of substrates which may be in the form of sheets, paper, wires, screening, fibers, solid or microporous objects, etc. Additionally, such polymer solutions may be formed into fibrids by shear-precipitation techniques (e.g., as described in Morgan U.S. 2,999,788); these fibrids can be pressed into papers.

EXAMPLES

The following non-limiting examples are illustrative of the practice of the preferred embodiments of this invention. Parts and percentages are by weight unless otherwise indicated. In these examples, inherent viscosity ($\eta_{inh}$) has been determined in accordance with the following equation $$\eta_{inh} = \frac{\ln(\eta_{rel})}{C}$$

wherein ($\eta_{rel}$) represents the relative viscosity and (C) represents a concentration of 0.5 gram of the polymer in 100 ml. of the solvent. The relative viscosity ($\eta_{rel}$) is determined by dividing the flow time in a capillary viscometer of a dilute solution of the polymer by the flow time for the pure solvent. The dilute solutions used herein for determining ($\eta_{rel}$) are of the concentration expressed by (C) above; flow times are determined at 30° C., using concentrated (95–98%) sulfuric acid as a solvent.

Fiber properties of tenacity, elongation, and initial modulus are coded as T/E/Mi and are in units of grams/denier, percent, and grams/denier, respectively.

Example 1

This example illustrates the preparation of poly(p-benzamide) from p-thionylaminobenzoyl chloride by one working of this invention.

Distilled p-thionylaminobenzoyl chloride, 2.01 g. (0.01 mole), M.P. 31° C., is placed in a dry 3-necked 50 ml. glass reaction flask equipped with a dry nitrogen inlet and a "Trubore" stirrer with a J shaped stirring end such that the liquid next to the side of the flask is well stirred. The reaction flask is kept under slight positive nitrogen pressure at all times. Distilled tetramethylurea with a water content of <200 p.p.m., 10 ml., is added. Gentle stirring gives an amber solution. Anhydrous powdered lithium hydroxide, 0.24 g. (0.01 mole), is added to the flask. Heat is evolved and the solution becomes viscous as polymerization proceeds; stirring is continued. After 17 hours, the reaction mixture is heated to about 130° C. for 2.5 hours. The viscous, cloudy, yellow reaction mixture is then added to stirred water (excess) in a blender. The precipitated polymer is collected, washed on the filter with water and acetone, and dried at 80° C. The yield is 99% of poly(p-benzamide), $\eta_{inh} = 0.95$.

Example 2

This example illustrates the preparation of poly(p-benzamide) from p-thionylaminobenzoyl chloride utilizing lithium chloride and a shortened reaction time.

(a) The reaction of Example 1 is carried out in essentially the same way except that a mixture of lithium hydroxide, 0.24 g. (0.01 mole), and lithium chloride, 0.42 g. (0.01 mole) is added to the solution of p-thionylaminobenzoyl chloride in tetramethylurea. The opaque viscous reaction mixture is heated at 90°–130° C. for 2 hours. The above-cited polymer is isolated in quantitative yield, $\eta_{inh} = 0.98$.

(b) A solution of 4.02 g. (0.02 mole) of p-thionylaminobenzoyl chloride (purified by successive distillation, crystallization, and sublimation procedures) in 17 ml. of tetramethylurea is reacted with 0.49 g. (0.02 mole) of lithium hydroxide and 0.26 g. (0.006 mole) of lithium chloride in the manner described in (a), above. The reaction is allowed to take place adiabatically for 1.0 hrs., then for 2 hrs. at about 135° C. The polyamide is isolated in 94% yield; $\eta_{inh} = 0.80$.

Example 3

This example illustrates a larger-scale synthesis of poly (p-benzamide) from p-thionylaminobenzoyl chloride, the polymeric composition comprising a spinning dope from which strong filaments are prepared by dry spinning.

The reaction in Example 1 is scaled up sixteen times in monomer in a suitable larger reaction flask of similar design. The reaction, as before, is maintained in a nitrogen atmosphere. The solution of p-thionylaminobenzoyl chloride (32.2 g.) in 100 ml. of tetramethylurea is stirred and a mixture of 3.84 g. (0.16 mole) of lithium hydroxide and 2.08 g. (0.049 mole) lithium chloride is added. Thereafter, 25 ml. of tetramethylurea and 5 ml. of a solution of water in tetramethylurea (formed by adding 1.92 moles of water to one liter of solution) are added. The amber solution becomes more viscous and warm. After about 20 minutes the very viscous solution is heated to 130° C. After about 10 minutes at this temperature, 15 ml. of tetramethylurea are added. Finally, after 30 more minutes, the heating bath is removed and the solution is left to cool overnight. The following day the reaction mixture is reheated to 130° C. to give a cloudy, yellow, viscous dope. The dope is poured into a spinning cell maintained at 120–125° C. and extruded through a 4 mil, 5 hole spinneret at 138–140° C. into a drying column maintained at about 200° C. The resulting fine denier filaments are wound up and extracted in water. After extraction, the fibers are heated at a temperature of 500° C. for a few seconds in a nitrogen atmosphere. The heat treated fibers exhibit the following average tensile properties: T/E/Mi: 7.4/1.4/577; a sample of the polymer, isolated from solution, exhibits an inherent viscosity of 1.0.

Example 4

This example demonstrates the preparation of poly(p-benzamide) by a process of this invention which utilizes a mixture of inert polymerization solvents. Strong filaments are prepared from this polyamide.

p-Thionylaminobenzoyl chloride is prepared by reacting thionyl chloride with p-aminobenzoic acid. The excess thionyl chloride is stripped from the reaction mixture and the crude dark colored residual liquid is used directly for polymerization. This crude p-thionylaminobenzoyl chloride (40.2 g., 0.2 mole) is placed in the reaction flask described in Example 3 and maintained in an atmosphere of nitrogen. To the flask is added a mixed solvent (170 ml.) consisting of about 50% by volume of tetramethylurea and 50% of benzene. To the solution thus formed are added 4.80 g. (0.2 mole) lithium hydroxide and 2.60 g. (0.06 mole) lithium chloride. The stirred reaction mixture becomes very viscous and precipitates polymer after 1 hour. The mixture is warmed in an oil bath heated to 130° C. The benzene volatilizes and carries with it the sulfur dioxide reaction product. After being heated for 1 hr., the resulting reaction mixture is left to stand overnight and is then isolated by precipitation in, and washing with, excess water in a blender. The gray, finely divided poly(p-benzamide) is isolated in 92% yield; $n_{inh}$=0.98. This polymer (19.3 g.) is dissolved in 145 ml. of a 7% solution by weight of lithium chloride in tetramethylurea by being stirred for 3.2 hrs. at 120–135° C. This solution, consisting of 11.6% polymer by weight, is extruded hot (140° C.) through a 4 mil, 10 hole spinneret into a drying column maintained at about 200° C. Three of the holes jet, then two, and finally only one. The filaments are wound up and extracted in water for about 24 hrs. The dried filaments exhibit the following tensile properties: T/E/Mi: 4.8/2/370. After the dried filaments are heated for a few seconds at 500° C. in a nitrogen atmosphere, they exhibit the following tensile properties: T/E/Mi: 9.6/1/880.

Example 5

This example illustrates the preparation of high viscosity poly(p-benzamide) as a gel in the reaction medium.

Crude p-thionylaminobenzoyl chloride described in Example 4 is purified by crystallization from the melt by cooling. A solution is prepared from 4.02 g. (0.02 mole) of crystallized crude material in 17 ml. of tetramethylurea containing about 160 p.p.m. of water. A mixture of 0.48 g. (0.02 mole) of lithium hydroxide and 0.26 g. (0.006 mole) of lithium chloride is added. The solution becomes warm in 5 minutes and after 32 minutes is quite viscous. After being stirred for 16 hours at room temperature in a nitrogen atmosphere a solid brown gel has formed. The gel persists during subsequent heating at 130–135° C. for 2 hours. The polymer is isolated by being stirred with excess water in a blender, washed with water, then with acetone, and dried. It is obtained in quantitative yield as a gray solid, $n_{inh}$=1.47.

Example 6

This example illustrates the preparation of a solution of poly(p-benzamide), employing a shortened reaction time and thionyl chloride in the process. The direct extrusion of filaments from this solution is shown.

A solution of 32.16 g. (0.16 mole) of distilled p-thionyl-aminobenzoyl chloride in 136 ml. of tetramethylurea is reacted with 0.76 g. of thionyl chloride. After stirring this mixture for about 5 minutes, a mixture of 4.48 g. (0.19 mole) of lithium hydroxide and 2.08 g. (0.049 mole) of lithium chloride is added. Nitrogen is bubbled through the reaction mixture by means of a sidearm attached near the bottom of the reaction flask. The reaction becomes warm and extremely viscous, then slowly becomes cloudy. After being kept 40 minutes at 50–55° C., the reaction mixture is warmed to about 135° C. and maintained at this temperature for about 4 hours. During this time the solution is evacuated to about 20–50 mm. pressure for 5 minutes to remove $SO_2$. The viscous solution is poured into a spinning cell and extruded through a 4 mil, 5 hole spinneret into a spinning column maintained at about 200° C. and swept with a concurrent stream of dry nitrogen. A mass of fine filaments is collected in the bottom of the dry spinning column. The polymer, isolated in the usual way, has an inherent viscosity of 1.11.

Example 7

This example demonstrates the preparation of poly-(p-benzamide) in N,N-dimethylacetamide by the process of this invention.

(a) Distilled p-thionylaminobenzoyl chloride, 4.02 g. (0.02 mole), and lithium chloride, 0.1 g., (0.002 mole) are dissolved in 17 ml. of distilled N,N-dimethylacetamide. To this solution is added 0.50 g. (0.02 mole) of lithium hydroxide. The reaction mixture becomes warm, and somewhat viscous. After 1 hour, the reaction mixture is heated to 130° C. and maintained at this temperature for an additional two hours. A brown fluid dispersion results. The polymer is isolated by precipitation into water in a blender. A quantitative yield of poly(p-benzamide) $n_{inh}$=0.40, is obtained.

(b) In a reaction similar to (a), above, but employing 0.26 g. of lithium chloride and 0.48 g. of lithium hydroxide, and which is cooled to room temperature after the reactants are mixed, the mixture is maintained at room temperature for 2 hrs., then heated at 125° C. for 1 hr., there is attained by the usual isolation method a quantity of poly(p-benzamide), $n_{inh}$=0.45.

Example 8

This example illustrates the preparation of poly(p-benzamide) in a solution containing thionyl chloride, and the preparation of films therefrom.

A solution of 4.02 g. (0.02 mole) of distilled p-thionyl-aminobenzoyl chloride and 0.3 g. (0.007 mole) of lithium chloride is made up in 17 ml. of tetramethylurea. To this solution is added .11 gm. of thionyl chloride. After 15 minutes, 0.54 g. (0.022 mole) of lithium hydroxide is added. The reaction becomes very warm and viscous. Films of poly(p-benzamide) are cast from this composition. A portion of the viscous composition from which films are not prepared after standing 16 hours develops haze, then gels. The gel does not dissolve when heated to 130° C. A sample of isolated polymer exhiits an inherent viscosity of 1.92.

Example 9

This example illustrates the preparation of a series of ordered copolyamides containing meta- and para-benzamide units by the process of this invention.

(a) A solution of 2.0 g. (0.01 mole) of m-thionyl-aminobenzoyl chloride in 20 ml. of tetramethylurea is reacted with 0.25 g. (0.01 mole) of lithium hydroxide and 0.2 g. (0.005 mole) of lithium chloride. After 0.5 hour, 5.03 g. (0.025 mole) of p-thionylaminobenzoyl chloride are added, plus 0.625 g. (0.026 mole) of lithium hydroxide. Polymerization is allowed to proceed for an hour at ambient temperature, then for 2 hours at about 125° C. A total of 4.24 g. of copoly(m-benzamide/p-benzamide) (28/72) is isolated from the nearly gelled solution by precipitation into water; $\eta_{inh}$=0.66.

(b) A preparation similar to (a), above, in which 1.0 g. (.005 mole) of m-thionylaminobenzoyl chloride, 0.125 g. (0.005 mole) of lithium hydroxide, and 0.2 g. (0.005 mole) of lithium chloride are reacted in 20 ml. of tetramethylurea, followed after 0.5 hour by addition thereto of 6.03 g. (0.03 mole) of p-thionylaminobenzoyl chloride and 0.75 g. (0.031 mole) of lithium hydroxide, gives, under the conditions of (a), 4.12 g. of copoly(m-benzamide/p-benzamide) (14/86), $\eta_{inh}$=0.62.

(c) A third preparation in which 0.50 g. (0.0025 mole) of m-thionylaminobenzoyl chloride is reacted with 0.062 g. (0.0026 mole) lithium hydroxide and 0.2 g. (0.005 mole) of lithium chloride in 20 ml. of tetramethylurea, followed after 0.5 hour by addition thereto of 7.04 g. (0.035 mole) of p-thionylaminobenzoyl chloride and 0.875 g. (0.036 mole) of lithium hydroxide, all reacted under the same conditions as (a), gives an opaque viscous mixture which yields 4.37 g. of copoly(m-benzamide/p-benzamide) (7/93), $\eta_{inh}$=0.72.

Example 10

This example illustrates the preparation of a solution of copoly(m-benzamide/p-benzamide) (14/86) by the process of this invention and the extrusion of filaments therefrom.

A solution of 6.03 g. (0.03 mole) of m-thionylaminobenzoyl chloride and 1.20 g. (0.028 mole) of lithium chloride in 120 ml. of tetramethylurea is reacted with 0.75 g. (0.031 mole) of lithium hydroxide. After 0.5 hr., 36.2 g. (0.18 mole) of p-thionylaminobenzoyl chloride are dissolved in the reaction mixture and 4.50 g. (0.19 mole) of lithium hydroxide are added thereto. The mixture becomes extremely hot in 2–3 minutes and turns opaque. After an hour at room temperature and 1–2 hours at 120° C., the warm mixture (130° C.) is extruded through a 5 ml, 4 hole spinneret into a hot (200–240° C.) nitrogen filled drying column. The filaments are extracted with water overnight and heated for a few seconds at 400° C. The fibers exhibit T/E/Mi of 2.3/2/159. The polymer has an inherent viscosity of 0.51.

Example 11

The preparations of poly(p-benzamide) and poly(m-benzamide) are illustrated in this example by procedures in which addition of the reactants is varied.

(a) A solution of 4.02 g. (0.02 mole) p-thionylaminobenzoyl chloride and 0.3 g. (0.007 mole) of lithium chloride in 17 ml. of tetramethylurea is reacted with 0.50 g. (0.02 mole) of lithium hydroxide. In 20 minutes a cloudy, very viscous solution forms. After one hour, the mixture is heated to 130° C. and held at this temperature for 2 hours. Gelation occurs during the heating period. The stiff rubbery gel is worked up in the usual way to give a quantitative yield of poly(p-benzamide), $\eta_{inh}$=1.33.

(b) A solution of 4.02 g. (0.02 mole) of distilled p-thionylaminobenzoyl chloride and 0.2 g. (0.04 mole) of lithium chloride in 17 ml. of tetramethylurea is stirred for 1 hour at room temperature. At the end of this time, 0.50 g. (0.02 mole) of lithium hydroxide is added. The solution becomes very warm in 4 minutes and progressively more viscous. After one hour, the reaction mixture is heated to 130° C. During a one hour heating period at this temperature the solution gels. Isolation of the polymer in the usual way gives a product of inherent viscosity of 1.25.

(c) A reaction is carried out in essentially the same way as in (b), above, but with a waiting period of 2 hours between formation of the solution of p-thionylaminobenzoyl chloride and lithium chloride in tetramethylurea and the addition of lithium hydroxide. A gelled solution of poly(p-benzamide) forms. Isolation of the polymer in the usual way gives a product soluble in concentrated sulfuric acid; $\eta_{inh}$=1.56.

(d) A solution of 4.02 g. (0.02 mole) of distilled m-thionylaminobenzoyl chloride and 0.2 g. (0.005 mole) of lithium chloride in 10 ml. tetramethylurea is stirred for 1 hr. at room temperature; 0.50 g. (0.02 mole) of lithium hydroxide is then added. The reaction mixture becomes hot and very viscous in 5 minutes. At the end of 1 hour, the reaction mixture is heated to 130° C. and maintained at this temperature for an additional hour. The poly(m-benzamide) is isolated in the usual way, $\eta_{inh}$=0.76.

Example 12

This example illustrates the use of p-aminobenzoic acid as a chain stabilizer and the use of N-methylpyrrolidone-2 as a solvent in the process of this invention.

(a) A solution of 4.02 g. (0.02 mole) of distilled p-thionylaminobenzoyl chloride, 0.20 g. (0.005 mole) of lithium chloride, and 0.02 g. (0.0001 mole) of p-aminobenzoic acid in 20 ml. of tetramethylurea is stirred for ten minutes at 55° C. The heating bath is removed and 0.50 g. (0.02 mole) of lithium hydroxide is added. Polymerization proceeds for one hour at autogenous temperature, then for an additional hour during which the reaction mixture is heated to 130° C. The gelled, cloudy yellow reaction mixture is treated in the usual way to isolate poly(p-benzamide), $\eta_{inh}$=1.19.

(b) The use of a larger quantity of p-aminobenzoic acid as a chain stabilizer in a polymerization conducted as in (a), above, results in a stabilized polymer of lower inherent viscosity. Thus, the use of 0.2 g. (0.001 mole) of sublimed p-aminobenzoic acid with 4.02 g. (0.02 mole) of p-thionylaminobenzoyl chloride as in the preceding part (a) gives poly(p-benzamide) of inherent viscosity=0.64.

(c) A solution of 4.02 g. (0.02 mole) of p-thionylaminobenzoyl chloride, 0.20 g. (0.005 mole) of lithium chloride, and 0.03 g. (0.0002 mole) of p-aminobenzoic acid in 20 ml. of N-methylpyrrolidone-2 is stirred for 10 minutes at 55° C. The heating bath is removed and 0.47 g. (0.02 mole) of lithium hydroxide is added. Polymerization continues for 0.5 hr. at autogenous temperature, then for 0.5 hr. during which the reaction mixture is heated at 100° C. The cloudy, brown reaction mixture is treated in the usual way to give poly(p-benzamide), $\eta_{inh}$=0.66.

Example 13

This example illustrates the preparation of poly(3-methyl-1,4-benzamide) by the process of this invention.

A solution of 2.16 g. (0.01 mole) of 3-methyl-4-thionylaminobenzoyl chloride and 0.10 g. (0.002 mole) of lithium chloride in 10 ml. of tetramethylurea is stirred for ten minutes at 55° C., after which the heating bath is removed and 0.25 g. (0.01 mole) of lithium hydroxide is added to the solution. Polymerization proceeds for one hour at room temperature, then for one hour at 130° C. The orange solution is precipitated by addition of water in a blender in the usual way. The product, poly(3-methyl-1,4-benzamide), is isolated as a light yellow solid in 85% yield, $\eta_{inh}$=0.19.

Example 14

This example illustrates the polymerization of the dimer of p-thionylaminobenzoyl chloride.

(a) A solution of 3.20 g. (0.01 mole) of p-(p-thionylaminobenzamido)benzoyl chloride and 0.4 g. (0.009 mole) of lithium chloride in 20 ml. of tetramethylurea is stirred for five minutes at room temperature. To this solution is added 0.25 g. (0.01 mole) of lithium hydroxide. Polymerization proceeds for one hour at room temperaure and for one hour at about 130° C. During the first hour of polymerization the solution becomes very viscous and gels within 30 minutes. At the higher temperature, a light brown cloudy viscous solution forms. The poly(p-benzamide) product, isolated in the usual manner, has an inherent viscosity of 1.20.

(b) A similar polymerization is carried out except that the solution of monomer and lithium chloride in tetramethylurea is stirred for 10 minutes at 55° C. before addition of lithium hydroxide. In this case, a light brown, cloudy, gelled solution results. The polymer, isolated in the usual way, has an inherent viscosity of 1.61.

Example 15

This example illustrates the use of water and lithium hydroxide in varying amounts as reactants in the polymerization process of this invention.

(a) A solution of 4.02 g. (0.02 mole) of p-thionylaminobenzoyl chloride, 0.2 g. (0.005 mole) of lithium chloride, and 0.03 g. (0.0002 mole) p-aminobenzoic acid in 15 ml. of tetramethylurea is stirred for 10 minutes at 55° C. At the end of this time 0.25 g. (0.01 mole) of lithium hydroxide and 5 ml. of aqueous tetramethylurea containing 2 moles of water per liter are added. The solution becomes very hot, slightly cloudy, and very viscous after five minutes. After one hour, the reaction mixture is heated to 130° C. and maintained at this temperature for 30 minutes. A light orange, very viscous, almost clear, solution results. The product is isolated in the usual way to give poly(p-benzamide), $\eta_{inh}=0.86$.

(b) The reaction of (a), above, is carried out in the same way except that 0.20 g. (0.008 mole) of lithium hydroxide and 5 ml. of aqueous tetramethylurea containing 2 moles of water per liter are added as reactants. In this case, a gelled, dark yellow, cloudy reaction mixture is produced at 130° C. The product is isolated in the usual way to give poly(p-benzamide), $\eta_{inh}=1.49$.

(c) The reaction of (a) and (b), above, is carried out but with another ratio of lithium hydroxide to aqueous tetramethylurea. A solution of 4.02 g. (0.02 mole) of p-thionylaminobenzoyl chloride, 0.03 g. (0.0002 mole) of p-aminobenzoic acid and 0.2 g. (0.005 mole) of lithium chloride in 18 ml. of tetramethylurea is stirred for 15 minutes at 55° C. Then, 0.40 g. (0.017 mole) of lithium hydroxide and 2 ml. of tetramethylurea containing 2 moles of water per liter are added. After a reaction period of 30 minutes at 55° C. and 30 minutes at 100° C., yellow, clear, gelled solution of poly(p-benzamide) forms. The polymer is isolated in quantitative yield, $\eta_{inh}=1.65$.

Example 16

This example illustrates the formation of random copolymers containing meta and para-benzamide units.

(a) A solution of 3.02 g. (0.015 mole) of distilled m-thionylaminobenzoyl chloride, 1.00 g. (0.005 mole) of p-thionylaminobenzoyl chloride, 0.03 g. (0.0002 mole) of p-aminobenzoic acid, and 0.2 g. (0.005 mole) of lithium chloride, in 15 ml. of tetramethylurea is stirred for 10 minutes at 55° C. At the end of this period, 0.25 g. (0.01 mole) of lithium hydroxide is added. After five minutes, 5 ml. of aqueous tetramethylurea containing 2 moles of water per liter are added. The reaction is allowed to proceed for 30 minutes without heating and for 30 minutes at 100° C. A clear, light yellow solution forms. The copoly(m-benzamide/p-benzamide) (75/25) is isolated in the usual way in quantitative yield, $\eta_{inh}=0.41$.

(b) A second reaction is run in the same way except that the reactants consist of 2.01 g. (0.01 mole) of m-thionylaminobenzoyl chloride and 2.01 g. (0.01 mole) of p-thionylaminobenzoyl chloride. A quantitative yield of copoly(m-benzamide/p-benzamide) (50/50), $\eta_{inh}=0.69$, is obtained.

(c) A third reaction in which 1.00 g. (0.005 mole) of m-thionylaminobenzoyl chloride and 3.02 g. (0.015 mole) of p-thionylaminobenzoyl chloride are reacted as shown above gives a gelled solution of copolymer. Isolation of the product gives a quantitative yield of copoly(m-benzamide/p-benzamide) (25/75), $\eta_{inh}=1.62$.

Example 17

This example illustrates the preparation of poly (p-benzamide) by the process of this invention, using both p-aminobenzoic acid and water in the reaction.

(a) A solution of 4.02 g. (0.02 mole) of p-thionylaminobenzoyl chloride, 0.2 g. (0.005 mole) of lithium chloride, and 0.03 g. (0.0002 mole) of p-aminobenzoic acid in 15 ml. of tetramethylurea is stirred for 10 minutes at 55° C. To the solution is added 0.25 g. (0.01 mole) of lithium hydroxide. After five minutes, 4.5 ml. of tetramethylurea containing 2 moles of water per liter (a 10% deficiency) are added. The reaction is allowed to proceed at about 0° to 25° C. for 40 minutes. The solution becomes very viscous. It is then heated to 100–110° C. for 10 minutes during which time the solution gels. The polymer is isolated in quantitative yield, $\eta_{inh}=1.60$.

(b) A solution of 4.02 g. (0.02 mole) of distilled p-thionylaminobenzoyl chloride, 0.2 g. (0.005 mole) of lithium chloride, and 0.03 g. (0.0002 mole) of p-aminobenzoic acid in 15 ml. of tetramethylurea is stirred for 10 minutes at 55° C. To this solution is added 0.25 g. (0.01 mole) of lithium hydroxide and, after 5 minutes, 2 ml. of aqueous tetramethylurea containing 2 moles of water per liter. After 28 minutes, the fluid, clear orange solution is heated to 100–110° C. and additional aqueous tetramethylurea containing 2 moles of water per liter is added dropwise. The reaction mixture gels suddenly after about 2 ml. of added. The product is isolated in the usual way to give poly(p-benzamide) in quantitative yield, $\eta_{inh}=1.77$.

Example 18

In this example is illustrated the use of a variety of chain terminators in the process of this invention.

(a) A solution of 4.03 g. (0.02 mole) of distilled p-thionylaminobenzoyl chloride, 0.2 g. (0.005 mole) of lithium chloride, and 0.03 g. (0.00015 mole) of isophthaloyl chloride in 15 ml. of tetramethylurea is stirred for 10 minutes at 55° C. The solution is cooled to 0° C. and 0.25 g. (0.01 mole) of lithium hydroxide is added. After 10 minutes, 4.5 ml. of aqueous tetramethylurea containing 2 moles of water per liter are added. After an additional 10 minutes at 0° C. and 30 minutes at room temperature, the reaction mixture is warmed to 100° C. and maintained at this temperature for 60 minutes. The clear, yellow, very viscous solution forms a loose, flowable gel at 100° C. Poly(p-benzamide) is isolated in quantitative yield, $\eta_{inh}=0.81$.

(b) A similar preparation, except that 0.12 g. (0.0006 mole) of isophthaloyl chloride is added, gives a polymer soluble in the reaction mixture; $\eta_{inh}=0.70$.

(c) In preparations of poly(p-benzamide) by processes similar to, but not equivalent to, that of (a), the use of other terminators produced the results shown below in Table I.

TABLE I.—EFFECT OF MONO- AND DIFUNCTIONAL TERMINATORS

| Item | Terminator | Mole percent terminators used | $\eta_{inh}$ of polybenzamide |
|---|---|---|---|
| 1 | Benzoyl chloride | 2.2 | 0.90 |
| 2 | Aniline | 1.0 | 1.00 |
| 3 | Terephthaloyl chloride | 2.0 | 1.10 |
| 4 | Phenyl p-aminobenzoate | 0.7 | 1.20 |
| 5 | M-phenylenediamine | 1.4 | 1.68 |

Example 9

This example illustrates a large-scale synthesis of poly (p-benzamide) by the process of this invention, using isophthaloyl chloride as a terminator. The polymerization solution is directly extruded into fibers whose tensile properties are enhanced by a subsequent heat treatment.

This reaction is conducted in a 1 liter resin kettle, flamed and flushed with nitrogen, as usual. The reaction is stirred with an aluminum egg beater type stirrer. A solution of 100.8 g. (0.5 mole) of distilled p-thionylaminobenzoyl chloride, 5.0 g. (0.12 mole) of lithium chloride, and 0.25 g. (0.01 mole) of isophthaloyl chloride in 400 ml. of tetramethylurea (22 p.p.m. water) is stirred for 45 minutes at 25° C. A slight amount of undissolved lithium chloride remains. The solution is cooled to 0° C. and 7.50 g. (0.31 mole) of lithium hydroxide are added. A cloudy yellow solution results. After the solution is stirred for 5 minutes, 90 ml. of aqueous tetramethylurea containing 2 moles of water per liter are added to it. An orange colored solution forms which becomes light yellow, and is nearly clear. As the reaction proceeds, heat is evolved; the solution becomes hazy and increases in viscosity. Ten minutes after addition of the aqueous tetramethylurea, 5.00 g. (0.21 mole) of lithium hydroxide are added and the ice bath used for cooling the reaction is removed. After 1.5 hours further reaction time, a light yellow, rubbery appearing mixture forms. This is heated to 100° C. to give a viscous clear solution. After 4 hours at 100–130° C., the clear solution is poured into a wet spinning cell and extruded as a multifilament yarn into hot water (about 90° C.). The yarn is extracted in water for 24 hours, then allowed to dry for several days. The dried fiber has a T/E/Mi ratio of 1.0/11/70 and an orientation angle of about 70°; $\eta_{inh}=0.76$ (polymer's $\eta_{inh}=0.74$; polymer contains 0.4% sulfur).

A portion of the yellow yarn is heated for one second at 536° C. in nitrogen to yield a fiber with a T/E/Mi ratio of 2.4/3.4/144 and an orientation angle of about 45°; $\eta_{inh}=1.21$.

Example 20

This example illustrates the use of lithium hydroxide monohydrate in the process of this invention.

A solution of 4.03 g. (0.02 mole) of distilled p-thionylaminobenzoyl chloride, 0.20 g. (0.005 mole) of lithium chloride, and 0.01 g. (0.00005 mole) of isophthaloyl chloride in 20 ml. of tetramethylurea is stirred for 10 minutes at 55° C., then is cooled to 0° C. To this solution is added 0.44 g. (0.01 mole) of lithium hydroxide monohydrate. After five minutes, the reaction is allowed to warm to room temperature and to polymerize for 30 minutes. During this time, the clear yellow solution becomes very viscous; haze slowly develops. An additional 0.25 g. (0.01 mole) of lithium hydroxide is added to complete the neutralization of evolved hydrogen chloride. In 2 minutes more, the solution gels. After 16 minutes, the reaction mixture is heated to 120° C. and maintained at this temperature for 4.5 hours. The final gelled solution is precipitated with water and isolated in the usual way to give a quantitative yield of poly(p-benzamide), $\eta_{inh}=1.67$.

Example 21

This example illustrates the polymerization of the dimer of p-thionylaminobenzoyl chloride.

(a) p-(p-thionylaminobenzamido)benzoyl chloride, 5 parts, is dissolved in tetramethylurea, 25 parts, containing 2% lithium chloride. The mixture is permitted to stand at room temperature in an open flask for 3 days during which time it becomes very viscous. The reaction mixture is then poured into water and mixed in a Waring Blendor. The product is isolated and washed 3 times with water and once with isopropyl alcohol to yield poly(p-benzamide) which, after being dried, exhibits an inherent viscosity of 1.06.

If the polymerization of the above-described dimer is accelerated by adding two drops of water to a solution of 5 parts of the dimer in 25 parts of tetramethylurea containing 2% lithium chloride and the reaction allowed to proceed at room temperature for two days, the inherent viscosity of the product obtained is 0.53.

(b) Ten parts of the dimer described in (a), above, are dissolved at 5° C. in 100 parts of tetramethylurea which contains 2% lithium chloride. The dimer dissolves immediately to produce a very fluid solution. The reaction mixture is allowed to come to room temperature with the exclusion of moisture. Atmospheric moisture is then admitted and the reaction mixture gradually becomes very viscous. The reaction mixture is slurried repeatedly with water, the polymeric product filtered and washed well with isopropyl alcohol and vacuum dried. The poly(p-benzamide) thus obtained has an inherent viscosity of 1.4.

Example 22

This example illustrates the effect of various solvents and of use of lithium hydroxide or lithium hydroxide monohydrate for the preparation of poly(p-benzamide) from p-thionylaminobenzoyl chloride.

Polymerizations are conducted in stirred systems under nitrogen with 4.02 g. (0.02 mole) of p-thionylaminobenzoyl chloride, 0.2 g. (0.005 mole) of lithium chloride and 20 ml. of the solvent or solvent mixture. After 30 min. stirring at room temperature of the above mixture or solution, 0.50 g. of lithium hydroxide or 0.84 g. of lithium hydroxide monohydrate is added. Polymerization proceeds for 1 hour without heating and then for 1 hour at 90–110° C. except when low-boiling solvents were used. The product, poly(p-benzamide), is isolated in the usual way. Polymerization variables and inherent viscosities of the isolated polymer are recorded in the table.

TABLE II.—POLY(p-BENZAMIDE), VARIATION OF SOLVENT AND BASE

| Solvent | Base | $\eta_{inh}$ | Base | $\eta_{inh}$ |
|---|---|---|---|---|
| Tetramethylurea (TMU) | LiOH | 0.92 | LiOH·H₂O | 1.22 |
| Hexamethylphosphoramide | LiOH | 0.17 | LiO·H₂O | 1.20 |
| N-methylpyrrolidone-2 | LiOH | 0.62 | LiOH·H₂O | 0.80 |
| N,N-dimethylacetamide | LiOH | 0.46 | LiOH·H₂O | 0.56 |
| Carbon tetrachloride | LiOH a | 0.19 | LiOH·H₂O b | 0.10 |
| Tetrahydrofuran (THF) | LiOH c | 0.12 | LiOH·H₂O a | 0.23 |
| Benzene | LiOH d | 0.21 | LiOH·H₂O b | 0.10 |
| o-Dichlorobenzene | LiOH | 0.15 | LiOH·H₂O | 0.12 |
| 50/50 vol. percent TMU/C₆H₆ | LiOH | 0.72 | LiOH·H₂O | 1.20 |
| 50/50 vol. percent TMU/THF | LiOH | 0.76 | LiOH·H₂O | 1.10 | a Heated for 1 hour at about 65° C.
b Heated for 1 hour at 80–85° C.
c Heated for 1 hour at about 60° C.
d Heated for 1 hour at 60–80° C.

Example 23

This example illustrates the preparation of an ordered copolymer of poly(p-benzamide/m-benzamide), corresponding to Formula IV herein, from 4-(3'-thionylaminobenzamido)benzoyl chloride by the process of this invention.

As a suspension of 28 g. of 4-(3'-aminobenzamido)benzoic acid in 500 ml. of dry toluene is stirred, 60 ml. of thionyl chloride are added thereto. This reaction mixture is then heated at reflux for 2 hrs. during which time most of the solid dissolves. The solvent and excess thionyl chloride are removed by means of a rotary evaporator. The tan solid residue is dissolved in 500 ml. of dry toluene at the boil. The toluene solution is filtered through a sintered glass funnel and the filtrate is cooled to room temperature whereupon a pale yellow precipitate forms. The precipitate is collected, washed with hexane, and dried in a desiccator under vacuum. The yield of 4-(3'-thionylaminobenzamido)benzoyl chloride is 28 g.

A solution of 3.2 g. (0.01 mole) of 4-(3'-thionylaminobenzamido) benzoyl chloride and 0.4 g. (0.009 mole) of lithium chloride in 20 ml. of tetramethylurea is stirred for 5 minutes at room temperature. To this solution is added 0.25 g. (0.01 mole) of lithium hydroxide. Polymerization proceeds for 1 hour at room temperature and for 1 hour at 130° C. During the first hour of polymerization the solution becomes very viscous. The copoly (p-benzamide/m-benzamide) (50/50) is isolated in the usual way and exhibits a high inherent viscosity.

Example 24

This example illustrates the affect of the presence of base in the reaction medium on the inherent viscosity of the polymer.

A solution of 4.02 g. (0.02 mole) of distilled p-thionylaminobenzoyl chloride, 0.26 g. (0.006 mole) of lithium chloride, and 20 ml. of tetramethylurea is stirred for 10 minutes at room temperature. To this solution is added 0.84 g. (0.02 mole) of lithium hydroxide monohydrate. After one hour at ambient temperature, the reaction mixture is heated for 1 hour to about 110–130° C. with stirring until the solution gels and can no longer be stirred. The polymer so produced is precipitated with water, washed with acetone, and isolated to yield poly(p-benzamide), $\eta_{inh}=2.28$.

The above procedure is repeated without adding the lithium hydroxide monohydrate. After 18 hours at ambient temperature, the reaction mixture is heated to about 110–130° C. for 1 hour. The polymer so produced is precipitated with water and isolated to yield poly(p-benzamide), $\eta_{inh}=0.31$.

As many variations of this invention may be made without departing from the spirit and scope thereof, it is to be understood that the invention is not limited to the specific embodiments thereof, except as defined in the following claims.

What is claimed is:

1. Process for the preparation of benzamide polymer having an inherent viscosity greater than about 0.2 as measured at 30° C. as a solution of the polymer is concentrated (95–98%) sulfuric acid at a concentration of 0.5 g. of polymer per 100 ml. of solvent comprising reacting in a solvent medium at least one type of monomer of the formula:

(I)
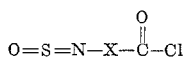

wherein X is selected from the group consisting of:

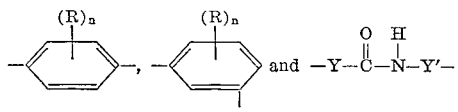

wherein R is a monovalent radical which is inert in the polymerization reaction, n is a cardinal number from 0 to 4, and Y and Y' are individually selected from the group consisting of:

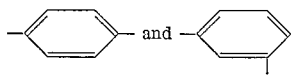

with approximately equimolar amounts of an inorganic basic reagent at a temperature between about 0° C. and 135° C. for from about 0.1 hr. to about 24 hrs.

2. Process according to claim 1, wherein said basic reagent is at least one base selected from the group consisting of:
water,
alkali metal hydroxide,
alkaline earth hydroxide, and
ammonium hydroxide.

3. Process according to claim 2 wherein n is 0.

4. Process according to claim 2, reacting one type of monomer of Formula I.

5. Process according to claim 3 wherein X is selected from the group consisting of:

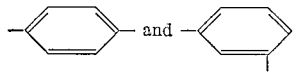

6. Process according to claim 4 wherein said monomer of Formula I is p-thionylaminobenzoyl chloride.

7. Process according to claim 2 wherein X is

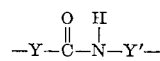

8. Process according to claim 4 wherein said one type of monomer of Formula I is p(p-thionylaminobenzamido) benzoyl chloride.

9. Process according to claim 3 wherein at least two types of monomer of the Formula I are reacted.

10. Process according to claim 2 further comprises reacting at least one type of monomer of the formula:

(II)
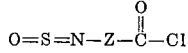

wherein Z represents a divalent organic radical comprising at least two carbocyclic rings possessing benzenoid unsaturation.

11. Process according to claim 2 wherein the reaction is agitated and maintained at between about 20° C. and 135° C. for about 0.5 to 4 hours, under an inert atmosphere.

12. Process according to claim 2 wherein said solvent medium comprises at least one solvent selected from the group consisting of N,N,N',N'-tetramethylurea, N,N-dimethylacetamide, N-methylpyrrolidone-2, and hexamethylphosphoramide.

13. Process according to claim 2 further comprising adding lithium chloride.

14. Process according to claim 1 wherein said basic reagent is at least one base selected from the group consisting of: lithium carbonate, lithium hydroxide and lithium hydroxide monohydrate.

15. Process according to claim 14 wherein said solvent medium comprises at least one solvent selected from the group consisting of N,N,N',N'-tetramethylurea, N,N-dimethylacetamide, N,N-dimethylisobutyramide, 1,3-dimethylimidazolidinone-2, and N-methylpyrrolidone-2 containing 0.5 to 2% lithium chloride, by weight, based upon the weight of said solvent.

References Cited

UNITED STATES PATENTS

| | | | |
|---|---|---|---|
| 3,203,933 | 8/1965 | Huffman et al. | 260—78 |
| 3,225,011 | 12/1965 | Preston et al. | 260—78 |
| 3,240,758 | 3/1966 | Smith et al. | 260—78 |

OTHER REFERENCES

Chem. Abstracts, vol. 29, 1935, 6588[3-4], Carré et al.
Chem. Abstracts, vol. 43, 1949, 1744 c-d, Riesz.
Comptes Rendues, 201, pp. 147–149, 1935, Carré et al., 1935.

WILLIAM H. SHORT, Primary Examiner

H. SCHAIN, Assistant Examiner

U.S. Cl. X.R.

117—161; 162—146; 260—30.2, 30.4, 30.6, 32.4, 32.6, 33.2, 33.6, 33.8; 264—184, 205